H. BAEHR & A. SOMMERFELD.
ARTIFICIAL PAW.
APPLICATION FILED JUNE 8, 1908.

924,875.

Patented June 15, 1909.

Witnesses
E. D. Elwell.
F. B. Roy

Inventors
Herman Baehr
Abraham Sommerfeld
By their Attorney
Clarence L. Galeton.

UNITED STATES PATENT OFFICE.

HERMAN BAEHR AND ABRAHAM SOMMERFELD, OF NEW YORK, N. Y.

ARTIFICIAL PAW.

No. 924,875.          Specification of Letters Patent.          Patented June 15, 1909.

Application filed June 8, 1908. Serial No. 437,272.

*To all whom it may concern:*

Be it known that we, HERMAN BAEHR, a citizen of the United States, residing in New York city, county and State of New York, and ABRAHAM SOMMERFELD, a citizen of the United States, residing in New York city, county and State of New York, have invented a certain new and useful Improvement in Artificial Paws; and we declare the following to be a full and exact description of the same.

In the manufacture of articles of apparel from fur it is common to use an artificial paw made by cutting and sewing a piece of fur skin into the form of a paw and fastening artificial representations of claws to this skin in the natural position.

The present invention relates to artificial paws made in this way, and to the artificial claws used in their manufacture. In the previous devices made for this purpose, with which we are familiar, rigid claws made from non-pliable material and having a securing plate integral therewith have been employed, the claws in such devices however, by reason of their rigidity, are not susceptible of adjustment or spreading to simulate the real claws of various animals, and therefore have but the fixed position in which they are made. Also in such devices the claws are spread to such a width as prevents their being passed through holes in the skin of the animal to which they are to be attached.

The object of the invention is to produce an artificial claw device of simple and inexpensive character which may be easily and securely fixed in place and which will present a lifelike imitation of the real claws.

A further object of our invention is to produce a device of this character made from pliable material, whereby the claws may be inserted through the skin while in close parallel relation and subsequently spread to assume the desired position and appearance.

The invention consists in a claw device in which several claws are secured to, and preferably formed integral with, a connecting member or plate by which they are secured in place in the paw and maintained in their proper relative positions, and it comprises, further, the use of soft metal or other pliable material in some portion or the whole of the claw device, so that after the claws have been inserted in the skin of the paw they may be and are spread apart at the ends to increase their resemblance to real claws.

Figure 1:
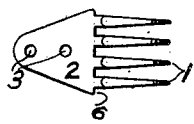
Figure 2:
Figure 3:
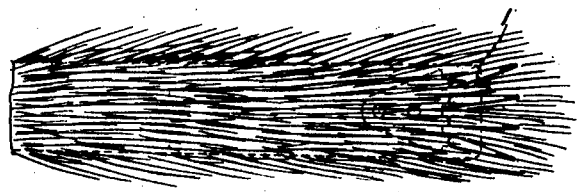

In the accompanying drawings, which represent the preferred embodiment of the invention, Figure 1 is a plan view of a claw device embodying the invention, and Fig. 2 is a side elevation of the same. Fig. 3 is a plan view of an artificial paw in which the improved claw device is used, and Fig. 4 is a longitudinal sectional view of the same, showing the claw device in side elevation.

The illustrated embodiment of the invention comprises four imitation claws 1 formed integral with a base plate 2. This claw device is made of pliable material, such as white metal, and may be made by a single stamping or casting operation at slight expense. Holes 3 may be made in the base plate for the reception of stitches, although these may be omitted, as the form of the device is such that extraneous fastening means are not necessary, the form of the device being such that it secures itself in place in the paw. The claws are joined to the base plate by thin necks 4 which pass readily through small openings in the skin.

Figure 4:
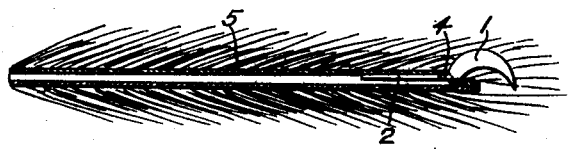

In making the artificial paw the claws of the claw device, which are originally in parallel position, as shown in Fig. 1, are passed through four perforations in the skin 5, as in Fig. 4, and the claws are then bent and spread apart, as in Fig. 3, so as not only to increase their resemblance to real claws but also to secure the device in place. The base plate may be cemented or sewed in place, for additional security, and the skin is then doubled under and sewn in the form of a paw, with the base plate between the thickness. It is then impossible for the claws to pull out, owing to their connection together at the base, and for the same reason they are maintained in fixed relative position. The claws are also secured against being withdrawn through the skin by the spreading apart of their ends.

By reference to Fig. 1 it will be noted that the outer claws 1 are offset a slight distance inwardly from the outer edges of the base plate 2, leaving shoulders 6 which engage beyond the sides of the holes in the skin through which said claws pass and serve as additional means to prevent the device from being withdrawn through the skin.

Obviously the form and size of the claws may be varied according to the nature of the fur with which they are used and any required number of claws may be secured to the base.

Various other modifications may be made in the embodiment of the invention hereinbefore described and illustrated in the accompanying drawings within the nature of the invention and the scope of the following claims.

We claim:

1. An artificial claw device comprising a plurality of claws made from pliable material to permit of their being spread after their insertion in a paw, and a base plate connecting said claws and serving as means to secure the device in place.

2. An artificial claw device comprising, in combination, a piece of skin having a series of small openings therein and arranged to simulate the appearance of a natural paw, a plurality of claws made from pliable material and in parallel relation whereby they may pass through the openings in the skin and be then spread apart, and a base plate connecting said claws and serving as means to secure the device in place.

HERMAN BAEHR.
ABRAHAM SOMMERFELD.

Witnesses:
 CLARENCE G. GALSTON,
 FLORENCE B. ROY.